United States Patent
Clauss et al.

(10) Patent No.: US 11,734,542 B2
(45) Date of Patent: Aug. 22, 2023

(54) TRANSPONDER LABEL AND METHOD FOR MANUFACTURING A TRANSPONDER LABEL

(71) Applicant: Schreiner Group GmbH & Co. KG, Oberschleissheim (DE)

(72) Inventors: Conrad Clauss, Munich (DE); Verena Voll, Dachau (DE); Severin Werner, Olching (DE)

(73) Assignee: Schreiner Group GmbH & Co. KG, Oberschleissheim (DE)

( * ) Notice: Subject to any disclaimer, the term of this patent is extended or adjusted under 35 U.S.C. 154(b) by 99 days.

(21) Appl. No.: 17/431,493

(22) PCT Filed: Feb. 11, 2020

(86) PCT No.: PCT/EP2020/053428
§ 371 (c)(1),
(2) Date: Aug. 17, 2021

(87) PCT Pub. No.: WO2020/169407
PCT Pub. Date: Aug. 27, 2020

(65) Prior Publication Data
US 2022/0147787 A1  May 12, 2022

(30) Foreign Application Priority Data

Feb. 18, 2019 (DE) ...................... 10 2019 104 014.0

(51) Int. Cl.
G06K 19/077 (2006.01)
H01Q 1/22 (2006.01)

(52) U.S. Cl.
CPC ....... *G06K 19/07758* (2013.01); *H01Q 1/225* (2013.01); *H01Q 1/2283* (2013.01)

(58) Field of Classification Search
CPC . G06K 19/07758; H01Q 1/225; H01Q 1/2283
(Continued)

(56) References Cited

U.S. PATENT DOCUMENTS 7,049,969 B2  5/2006  Tamai
8,538,591 B1  9/2013  Klughart
(Continued)

FOREIGN PATENT DOCUMENTS

DE  10 2012 007 551 A1  11/2012
EP  2 535 849 A1  12/2012
EP  2 808 840 A1  12/2014

OTHER PUBLICATIONS

International Search Report in PCT/EP2020/053428, dated May 12, 2020.
(Continued)

*Primary Examiner* — Allyson N Trail
(74) *Attorney, Agent, or Firm* — Collard & Roe, P.C.

(57) ABSTRACT

A transponder label has a dielectric spacer body with a first side and a second side and a transponder inlay with a chip and an antenna, wherein the transponder inlay is applied to the spacer body such that a first part of the antenna is arranged on the first side of the spacer body and a second part of the antenna is arranged on the second side of the spacer body. The transponder label further includes a sensor unit electrically coupled to the chip of the transponder inlay and configured to detect a measurement signal representative of a physical and/or chemical environmental parameter.

17 Claims, 4 Drawing Sheets

Figure 1:
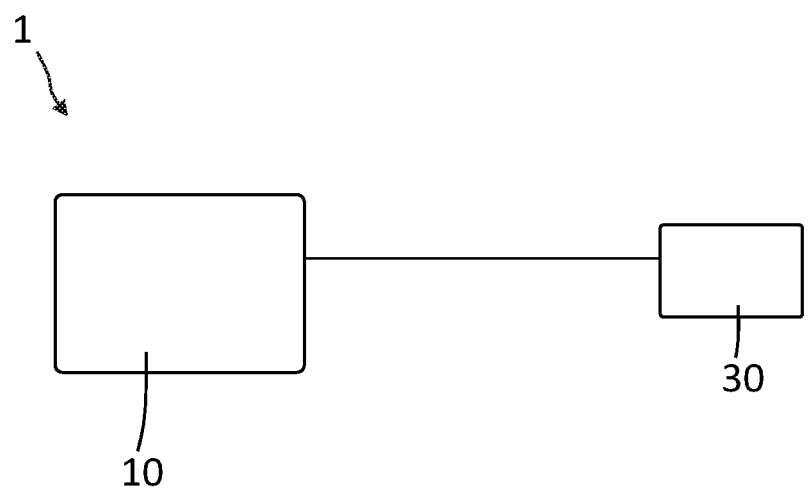

(58) Field of Classification Search
USPC .......................................................... 235/492
See application file for complete search history.

(56) References Cited

U.S. PATENT DOCUMENTS

| | | | |
|---|---|---|---|
| 9,070,060 | B2 | 6/2015 | Forster |
| 2005/0035924 | A1* | 2/2005 | Liu .................. G06K 19/07752 |
| | | | 343/895 |
| 2006/0080819 | A1 | 4/2006 | McAllister |
| 2008/0122631 | A1 | 5/2008 | Kodukula et al. |
| 2011/0014492 | A1* | 1/2011 | Joshi .................. C23C 18/1641 |
| | | | 427/322 |
| 2011/0018689 | A1* | 1/2011 | McAllister ............ B65C 9/1865 |
| | | | 340/10.1 |
| 2012/0318874 | A1 | 12/2012 | Germann et al. |
| 2014/0182370 | A1* | 7/2014 | Kienzle .................. H01Q 19/19 |
| | | | 73/290 V |
| 2016/0295705 | A1* | 10/2016 | Stoeppelmann ......... C08K 7/14 |
| 2017/0340254 | A1 | 11/2017 | Davis et al. |
| 2018/0021184 | A1 | 1/2018 | Monson et al. |
| 2018/0112349 | A1 | 4/2018 | Herschler et al. |
| 2019/0272495 | A1* | 9/2019 | Moeller ............... G06Q 10/083 |
| 2021/0187200 | A1* | 6/2021 | Urbanek ............. A61M 5/3157 |

OTHER PUBLICATIONS

Sennan Search Report in DE 10 2019 104 014.0, dated Nov. 26, 2019, with English translation of relevant parts.
Nie et al., Electrochemical sensing in paper-based microfluidic devices, Lab on a Chip, 10(4), 477-483, 2010.

* cited by examiner

TRANSPONDER LABEL AND METHOD FOR MANUFACTURING A TRANSPONDER LABEL

CROSS REFERENCE TO RELATED APPLICATIONS

This application is the National Stage of PCT/EP2020/053428 filed on Feb. 11, 2020, which claims priority under 35 U.S.C. § 119 of German Application No. 10 2019 104 014.0 filed on Feb. 18, 2019, the disclosure of which is incorporated by reference. The international application under PCT article 21(2) was not published in English.

The present invention relates to a transponder label and a method for manufacturing a transponder label. More particularly, the present invention relates to a transponder label having sensing means for use on a metallic surface, and a method by which such transponder labels can be efficiently manufactured.

Labels can be used for authorization or proof of origin and can be used wherever it is necessary to identify or verify objects. Some labels have electronic components, such as RFID transponders, which, for example, make it easy to find and record the labels and the information they contain. Thus, among other things, logistics or warehouse management can be realized in an automated and computer-aided manner.

RFID elements or RFID transponders usually have a chip on which the electronic information can be stored, as well as an antenna via which the stored information can be transmitted wirelessly to a reading and writing device. Since electromagnetic waves are required for data exchange between the transponder and the reader, the data exchange can be negatively affected by electrically conductive components. In particular, if the transponder has to be applied to a metal surface, data exchange can be impeded.

It is a task of the present invention to provide a transponder label which, on the one hand, can be produced inexpensively and, on the other hand, has very good transmitting and receiving properties on a metallic object and, in addition, offers extended functionality.

This task is solved respectively by the subject-matter of the independent patent claims. Advantageous embodiments are indicated in the respective dependent patent claims.

According to one aspect of the invention, a transponder label comprises a dielectric spacer body having a first side and a second side and comprises a transponder inlay including a chip and an antenna, wherein the transponder inlay is applied to the spacer body such that a first portion of the antenna is disposed on the first side of the spacer body and a second portion of the antenna is disposed on the second side of the spacer body. The transponder label further comprises a sensor unit which is electrically coupled to the chip of the transponder inlay and which is adapted to detect a measurement signal which is representative of a physical environmental parameter.

By means of the described transponder label, a reliable data exchange between a transponder and a reader can be realized even in the presence of a metal surface. In addition, the transponder label with the sensor unit enables information relating to one or more environmental parameters to be recorded and transmitted.

The transponder inlay realizes an RFID transponder (RFID=Radio Frequency IDentification), which comprises a chip and an antenna. Such a transponder enables contactless data transfer and also does not require any freely accessible visual contact, as is the case when reading an optical data code, for example. Due to the special design of the antenna of the transponder inlay, which is folded in a controlled manner around the spacer, the described structure of the transponder label enables reliable and stable data transfer even on a metallic ground.

According to a preferred embodiment, the transponder label comprises a flexible film substrate with a first side and a second side. The transponder inlay, the spacer and the sensor unit are arranged on the first side.

The transponder label may further comprise an adhesive layer arranged on a second side of the flexible film substrate. The adhesive layer serves in particular for simple and reliable attachment of the transponder label to a substrate provided therefor. Due to the described structure of the transponder label, a reliable and stable data exchange is also possible on a metallic substrate.

The first side of the film substrate may also be referred to as top side and the second side of the film substrate may be referred to as bottom side. Accordingly, the first side of the spacer body may be referred to as the top side and the second side of the spacer body may be referred to as the bottom side. In this context, terms such as "top", "bottom", "top side" and "bottom side" may refer to a stacking direction of existing layers of the transponder label, or to an arrangement of the transponder label on a substrate. A respective bottom side of an element then faces the substrate, and a top side of the element then faces away from the substrate.

The transponder label may comprise a further adhesive layer disposed on the first side of the flexible film substrate. The further adhesive layer is used, for example, for easy and reliable attachment and positioning of the transponder inlay, the spacer body and the sensor unit on the film substrate.

The spacer body is preferably formed as a foam element or a foam sheet around which the antenna is folded. A foam, a liner and the sensor unit to be coupled can be provided from a roll in a time-saving and low-cost manner, so that efficient and cost-effective production of a large number of transponder labels according to the invention is possible. Production costs can thus be significantly reduced compared with alternative products.

A stripline antenna is formed by the antenna folded around the foam or spacer. The dimension of the antenna is related to the used frequency of the system. In particular, the antenna is a lambda/4 stripline antenna.

Preferably, the foam element has a maximum thickness of 1.5 millimeters. This makes it possible to produce very thin transponder labels that nevertheless have an excellent reading range on electrically conductive substrates.

The transponder label combines an RFID transponder with sensor technology in a flat and flexible label product. The RFID transponder forms a radio device with an antenna section or transmitter and receiver unit that also functions on metal, so that reliable performance is ensured on metallic substrates as well. The RFID transponder is preferably coupled directly to the sensor unit, which, as a detection part, enables recording and transmitting of measurement signals that contain information about an environmental parameter.

The sensor unit is not necessarily attached directly to the antenna, but can be connected to it via supply lines that are integrated as electrically conductor tracks in the transponder label. The distance between the sensor unit and the antenna or the chip of the transponder inlay depends on the design and can be up to 20 cm, for example. However, longer distances are also quite conceivable depending on the application. In this way, the detection part or the sensor unit and the antenna part can be attached in accordance with the application intended for it in such a way that the relevant sensor information is recorded at the point to be detected and simultaneously the RFID transponder is positioned for the best possible reading range.

The antenna of the transponder inlay forms a transmitting and receiving unit of the transponder label. The antenna is designed in particular with regard to use at or on metallic surfaces and has a high-frequency active part and a grounding part, for example in the form of a grounding surface. In this case, the antenna is folded or crimped around the spacer body and is electrically conductively connected to the chip of the RFID transponder.

In addition to connections for the antenna, the chip has other connection options that enable the sensor unit to be connected. The chip can have analog inputs that enable the detection of passive resistive or capacitive sensor data. The chip may alternatively or additionally be set up to detect an output voltage level of an active sensor element or those which can communicate with other electronic components via simple interfaces, such as an I$^2$C serial data bus.

According to a further preferred embodiment of the transponder label, the antenna is formed by means of printing or etching or punching. The sensor unit itself and any electrically conductor tracks that may be present can also be formed by means of printing or etching or punching.

According to a particularly preferred embodiment of the transponder label, two electrically conductor tracks spaced apart from one another that form the sensor unit. In a particularly simple design, the sensor unit can thus be formed by only two predetermined structured conductor tracks. For example, such an embodiment realizes a wetness sensor for metallic substrates. In this case, the detection part or the sensor unit has only two spatially separated conductor tracks, which are electrically short-circuited via a liquid to be detected. The change in resistance resulting from the water or liquid is registered by the RFID chip of the transponder inlay and can be read out via an air interface.

According to a further preferred further embodiment, the transponder label has electrically conductor tracks that electrically couple the sensor unit to the antenna or the chip of the transponder inlay, wherein a respective conductor track having one or more predetermined geometric structural changes. Such structural changes are particularly suitable for suppressing interference effects that may result from induced potential differences or currents at a sensitive input of an electronic component in high-frequency fields. Such an interference field can occur, for example, when the RFID transponder is placed in an alternating field of a reader for data transmission. Electromagnetic waves of the alternating field can couple into a respective conductor track and form unwanted standing waves within the conductor track, which form an interference influence with respect to a signal transfer. By means of predetermined geometric structural changes, the formation of standing waves can be counteracted without additional components and it can contribute to a low-interference signal transfer.

The geometric structural changes are arranged irregularly in the conductor track, for example in the form of variations of a conductor track width and/or a conductor track thickness, and establish impedance jumps for a forming standing wave, at which this is partially reflected. The geometric structural changes realize a local change of a characteristic impedance of the conductor track and prevent or impede the formation of standing waves and the associated interference. Such geometrically modified conductor paths are particularly suitable for longer connecting lines between the antenna and the sensor unit. The respective conductor track thickness of the conductor tracks refers, for example, to a normal direction of a surface of a substrate layer on which the conductor tracks are applied. Accordingly, the conductor track width refers to a plane parallel to the surface of such a substrate layer.

In addition, the predetermined formed geometric structural change may also be formed by a distance from a grounding surface. For example, the transponder label has an electrically conductive grounding surface spaced from the conductor track on the surface of a substrate layer so that a spacing is formed along the surface between the conductor track and the grounding surface. The geometric structural change may be formed predeterminedly by means of a local change of the distance between the conductor track and the grounding surface.

The respective predetermined geometrical structural change realizes a consciously introduced or formed change in a geometric extent of the conductor track and/or a substrate layer on which the conductor track or conductor tracks are disposed. Preferably, a plurality of such geometric modifications are provided so that formation of undesired standing electromagnetic waves within the conductive track is efficiently counteracted. In this context, it is a finding within the scope of the present invention that, in particular, a purposefully formed variation of the conductor track width has a beneficial influence on a low-interference signal transfer.

The sensor unit of the transponder label is set up, for example, to detect a measurement signal that is representative of a temperature and/or a pressure. Alternatively or additionally, the sensor unit may be arranged to detect a fill level of a container, a wetness, a moisture and/or a humidity.

Further, the transponder label may be configured to provide sensor data collection via an active component. Such an active component may be equipped with its own power supply or may obtain a power supply via the antenna from a reading field. A power supply by means of so-called energy harvesting from a reading field can also provide the power supply. A sensor data transmission from the active component to the RFID radio device of the transponder label can take place via a data bus, such as an I$^2$C interface, and from the RFID radio device to the reader via an air interface.

In a preferred embodiment, the transponder label further comprises a foil element that covers at least a portion of the transponder inlay. In addition, the transponder label may further comprise another foil element covering at least a partial area of the first foil element. Such foil elements offer good possibilities for visual identification of the transponder label and also provide protection against soiling and possible damage. In particular, they can be inscribable or printable.

The transponder label described enables electronic sensor data to be read out by means of an RFID transponder in the form of a flexible label and for applications on metallic substrates as well. The linking of sensor technology with an RFID transponder realized by the transponder label enables a field of application in which high requirements and complexity of data processing are given.

The sensor data acquisition made possible by the transponder label does not require a direct (plug) connection of a sensor with a readout device. If a sensor is connected directly to a readout device, relevant sensor data can be falsified. For example, if ambient or environmental conditions, such as a temperature, humidity or air pressure, are of interest in a closed volume, such as a packaging unit or container, the volume must be opened for a readout of the data. This changes the external circumstances and can falsify the results. By means of the described transponder label, such data can be read out from the outside without opening the volume.

Data transmission via an air interface with relatively complicated transmission formats, such as Bluetooth or WiFi networks, is also not required by using the transponder label. Compared to a structure with interconnections of many individual components of electronic parts, as they are formed for example in so-called hard tags, in which the components are encapsulated on a circuit board basis in a plastic matrix, the transponder label has a simple, flat and clear structure, which offers a variety of possible applications, among other things due to its mechanical flexibility. Hard tags that enable data transmission via Bluetooth, WiFi or RFID are relatively cost-intensive to produce and are therefore only manufactured as a mass product to a limited extent. The transponder label described provides a cost-effective alternative in this respect.

In addition, the described transponder label enables reliable and stable data acquisition and data transmission of sensor data based on an RFID transponder without requiring a relatively thick spacer to a metallic substrate. Compared to sensors that require a direct electrical connection to read out data, the described transponder label also enables a time-saving and low-effort readout of a wide range of sensor data.

According to a further aspect of the invention, a method for manufacturing a transponder label comprises providing a dielectric spacer body having a first side and a second side, and providing a transponder inlay having a chip and an antenna, and providing a sensor unit configured to detect a measurement signal representative of an environmental physical parameter. The method further comprises applying the transponder inlay to the spacer body such that a first portion of the antenna is disposed on the first side of the spacer body. The method further comprises folding the transponder inlay around the spacer body so that a second portion of the antenna is located on the second side of the spacer body, and coupling the sensor unit to the chip of the transponder inlay by means of electrically conductor tracks.

By means of the described manufacturing method, a transponder label can be realized in a simple and inexpensive manner, which has advantageous transmitting and receiving properties and also enables sensor data to be recorded and transmitted. The method can be used in particular for producing an embodiment of the previously described transponder label, so that, if applicable, the described properties and features of the transponder label are also disclosed for the method, and vice versa.

According to a preferred embodiment, the method further comprises providing a flexible film substrate having a first side and a second side, and applying the transponder inlay, the spacer body, and the sensor unit to the first side of the flexible film substrate. Further, the method may include applying or providing an adhesive to at least one of the first side and the second side of the flexible film substrate.

Further, the method may be further configured to apply an adhesive to the bottom side or the second side of the spacer body and the second portion of the antenna.

In a particular embodiment, the transponder label comprises an adhesive coating covering at least a portion of the bottom or second side of the foam member and the second portion of the antenna. Thus, the label can be easily adhered to a product to be labeled. Preferably, the transponder label further comprises an adhesive cover covering the adhesive coating on the second side of the foam element and the second portion of the antenna. Particularly advantageous in this regard is an adhesive cover made of a film web. Moreover, this can also extend on a bottom side and/or an upper side of the transponder label and contribute to a beneficial handling and to an improved protection of the components.

Preferably, the application or formation of components to form the transponder label may be accomplished by means of printing or etching or die cutting. For example, the antenna, the conductive tracks and/or the sensor unit are printed on a substrate layer or formed by etching or punched out of a predetermined material. In this way, for example, the sensor unit can be formed in the form of two electrically conductive tracks spaced apart from one another.

In particular, the components that are functionally relevant for the transponder label can be produced or applied to a flexible film substrate. This makes it possible to realize an RFID sensor product that can be applied as a label or is also (partially) suitable for three-dimensional forming.

The antenna part as well as conductor tracks, which can be provided as connecting lines between the antenna and the sensor unit, can be produced by means of common etching processes or printing processes with functional conductive inks or other structuring processes, such as stamping.

The sensor unit can be formed either as an additional component on a substrate or directly by means of printing. For example, simple temperature-, pressure- or strain-sensors can be formed and connected as components of printed electronics directly with the manufacture of the antenna structure.

The transponder label described enables wireless coupling to a readout device. The data to be collected can be acquired over sufficiently large distances via an air interface. In addition, a so-called bulk capture of a large number of sensor data, even from different sensors, is possible. In addition, an external connection of a sensor element is also possible. Depending on the application, the sensor element or the sensor unit can be directly linked to the antenna production.

Depending on the application, various forms of design can be realized. The choice of RFID chip depends, among other things, on the desired type of detection. In particular, the sensor unit may be capable of detecting one or more of the following physical and/or chemical quantities: a temperature; a pressure, such as air pressure or mechanical pressure on a touch element; an elongation or bending; a wetness; a humidity or air moisture; a presence of certain substances or a quantity of certain substances or chemicals; a light intensity; an electrical quantity such as voltage, current, resistance, capacitance; a filling level of a container.

Possible designs of the transponder label include being formed in connection with a link to the RFID radio device: The transponder inlay may be coupled to one or more passive sensors. Alternatively or additionally, the transponder inlay is coupled to one or more active sensors that provide, for example, an analog data signal to the RFID radio device. Alternatively or additionally, active components may be provided which are in turn coupled to sensors and provide a respective digital signal to the RFID radio via a corresponding communication interface.

Figure 2:
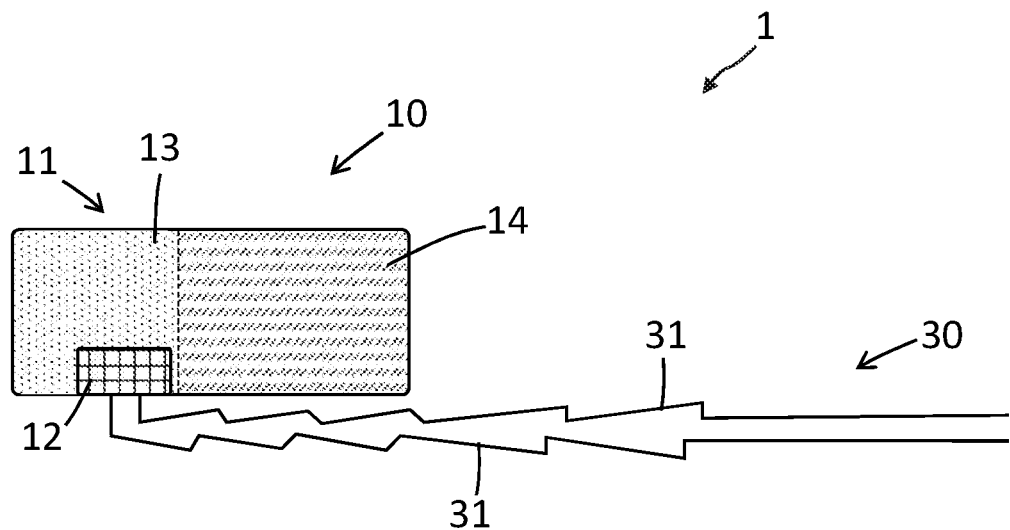
Figure 3:
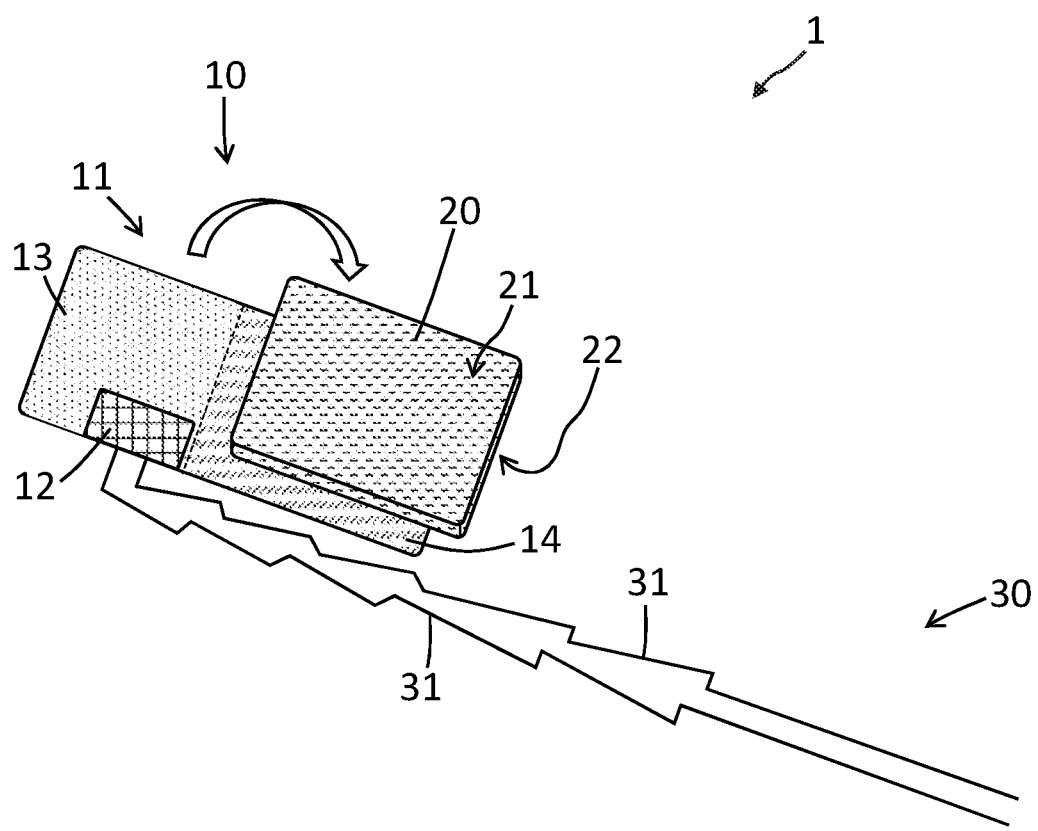
Figure 4:
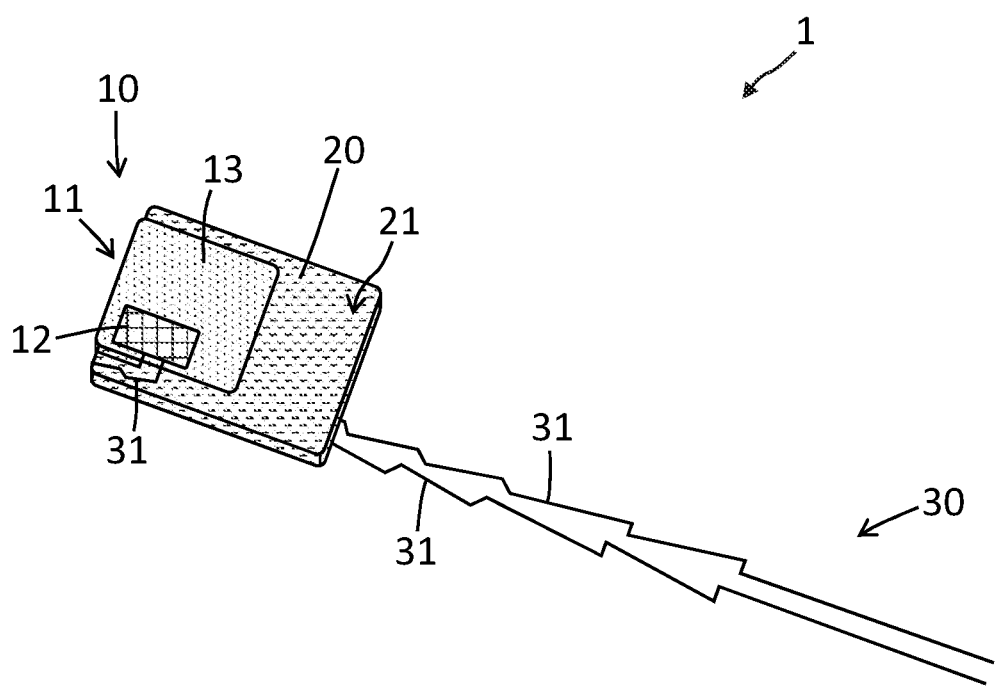
Figure 5:
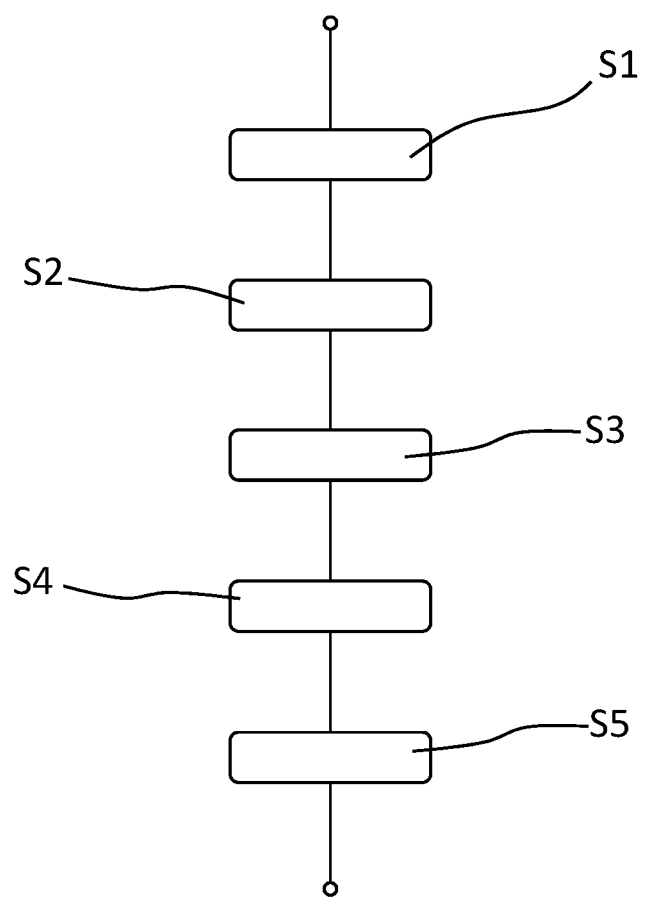

In the following, embodiments of the described transponder label are explained with reference to schematic drawings. They show:

FIG. 1 a schematic illustration of a transponder label,
FIGS. 2-4 an embodiment of a transponder label,
FIG. 5 a flow chart for a method for manufacturing a transponder label.

Elements of the same design and function are marked with the same reference signs across the figures. For the sake of clarity, not all the elements shown in all the figures are identified by the corresponding reference signs, possibly.

FIG. 1 shows a schematic illustration of a transponder label 1 with a transponder inlay 10 and a sensor unit 30, which is electrically coupled to the transponder inlay 10. The transponder inlay 10 has a chip 12 and an antenna 11 that form an RFID radio device. The RFID radio device is electrically connected to the sensor part or the sensor unit 30, for example, by means of a connection part in the form of lead wires.

The transponder label 1 further comprises a dielectric spacer body in an embodiment of a foam member 20 having a top side 21 and a bottom side 22. The transponder inlay 10 is disposed on the foam element 20 such that a first part 13 of the antenna 11 is disposed on the top side 21 of the foam element 20, and a second part 14 of the antenna 11 is disposed on the bottom surface 22 of the foam element 20 (see FIGS. 3 and 4).

The top side 21 of the foam element 20 may also be referred to as the first side and the bottom side 22 may also be referred to as the second side of the foam element 20. Accordingly, the top side and bottom side of further elements may be referred to as the first and second sides. In this context, terms such as "top", "bottom", "upper side" and "bottom side" may refer to a stacking direction of existing layers of the transponder label 1 or to an arrangement of the transponder label 1 on a ground. A respective bottom side of an element then faces the ground, and a top side of the element then faces away from the ground.

The sensor unit 30 is electrically coupled to the chip 12 and/or the antenna 11 of the transponder inlay 10 and is configured to detect a measurement signal representative of a physical or chemical environmental parameter. For example, the sensor unit 30 is adapted to sense a temperature, a pressure, an elongation or bending, a wetness, a humidity or moisture, a presence or amount of a particular substance, a light intensity, an electrical quantity, and/or a fill level of a container.

FIG. 2 shows a top view of components of the transponder label 1 without the foam element 20 that is still to be provided. The transponder label 1 realizes, for example, an RFID wetness sensor that can also function on metal, in which two electrically conductive tracks 31 that are spaced apart from one another form the sensor unit 30. The antenna portion 11 has a transmitting surface forming the first part 13 of the antenna 11, and a grounding surface forming the second part 14 of the antenna 11. The chip 12 is disposed on the first part 13 of the antenna 11 and is electrically coupled to the conductive tracks 31. The conductive tracks 31 are each formed as leads to the chip 12 with predetermined geometric structural changes. They each have an irregular zig-zag shape and help to reduce an influence due to unwanted high-frequency interference at the chip input. The conductive tracks 31 may also be formed in a modified manner with respect to their track width, and may have a plurality of geometric structural changes.

For example, a respective track width of adjacent conductive track sections can vary. Furthermore, alternatively or additionally, a conductive track thickness of the respective conductive track section may be formed irregularly in the conductive track 31 and establish impedance jumps. Such geometric structural changes realize a local change of a characteristic impedance of the conductive track 31, respectively, and prevent or impede the formation of standing waves and the associated interference inputs. Such geometrically modified conductor tracks 31 are particularly suitable for longer connecting lines between the antenna 11 and the sensor unit 30. The respective conductive track thickness of the conductive tracks 31 refers, for example, to a normal direction of a surface of a substrate layer to which the conductive tracks 31 are applied. Accordingly, the conductive track width refers to a plane parallel to the surface of such a substrate layer. Thus, the zigzag shape of the conductive tracks 31 is preferably formed of irregularly wide conductive track sections.

The predetermined geometric structural modification realizes in each case a controlled introduced or formed modification of a geometric extension of the conductive track 31. Preferably, several such geometric modifications are provided so that a formation of undesired standing electromagnetic waves within the conductive track 31 is efficiently counteracted. In this regard, it is a finding within the scope of the present invention that, in particular, a variation of the width of the conductive track has a beneficial influence on a low-interference signal transfer at the sensitive input of the transponder inlay 10.

Exposure to water or wetness of a liquid forms an electrical connection between the conductive tracks 31, thus short-circuiting them. The short circuit is detected by the RFID chip and can be provided as an information signal, so that when the RFID chip is read, it is indicated that wetness has been detected at the position of the transponder label 1. An absorbent porous material may also be disposed on or under the conductive tracks 31, which may increase a reliability of detection of small amounts of liquid. For example, a paper element or nonwoven fabric is disposed on or below the conductive tracks 31 which can absorb a droplet of liquid and distribute it evenly over the conductive tracks 31.

FIG. 3 illustrates the transponder label 1 in a step of its manufacture, showing that in order to form the transponder label 1, the transmission area or the first part 13 of the antenna 11 is folded along a predetermined fold line between the first and second parts 13 and 14 around the spacer body or the foam element 20.

FIG. 4 shows in a schematic view the completed transponder label 1 according to FIGS. 2 to 3. The foam element 20 made of an electrically insulating dielectric material is arranged in the center of the antenna 11 between the first and second parts 13 and 14. The foam element 20 typically has a material thickness of 2 mm or less. Preferably, the foam element 20 has a thickness of 1.5 mm or less, and particularly preferably a thickness of 1.2 mm or less, so that a particularly flat transponder label 1 can be realized which also has reliable and advantageous transmission and reception properties that enable stable data exchange even on metallic grounds.

Around the foam element 20, i.e. on the upper side 21, the bottom side 22 and a side edge of the foam element 20, the transponder inlay 10 is attached. The transponder inlay 10 is thereby attached to the foam element 20 in such a way that the chip 12 is located on the upper side 21 of the foam element 20. In this context, the upper side 21 is understood to be the side of the foam element 20 that faces away from a metal surface when the complete transponder label 1 is applied to a metal surface. Accordingly, the side of the foam element 20 facing the metal surface when the transponder label 1 is applied is referred to as the bottom side 22.

The first part 13 of the antenna 11 of the transponder inlay 10 is attached to the upper side 21 of the foam element 20. The first part 13 of the antenna 11 may be arranged on the upper side 21 of the foam element 20 by means of folding over around the foam element 20. Alternatively, the second part 14 of the antenna 11 may be wrapped around the foam element 20 so that it comes to rest on the bottom side 22 of the foam element 20.

In an applied state, the two parts 13 and 14 of the antenna 11 on the upper side 21 and the bottom side 22 of the foam element 20 preferably extend parallel to each other, thus forming a stripline antenna 11. The extension of the antenna surface in one direction is thereby about a quarter of the wavelength of the operating frequency. This type of antenna is therefore also referred to as a lambda/4-antenna.

FIG. 5 shows a flow chart for a method of producing the transponder label 1, which represents an exemplary production process. First, a suitable foam web is provided, which provides the subsequent spacer body in the form of a foam element 20. Preferably, in a step S1, the foam web is provided as a roll material and, for the production of individual foam elements 20, the foam web is unrolled from the roll.

In addition, the transponder inlay 10 with the chip 12 and the antenna 11 is provided, and the sensor unit 30 is provided. These components can also be provided in the form of a material web. The transponder inlay 10 may have been previously provided with an adhesive. If, on the other hand, the transponder inlay 10 is not adhesive, a suitable adhesive will be applied beforehand to the transponder inlay 10 and/or to parts of the foam web.

Subsequently, in a step S2, the transponder inlay 10 is applied to the foam web in such a way that a part of the antenna 11 and the chip 12 of the transponder inlay 10 come to rest on a first side of the foam web, which can also be referred to as the top side.

If the transponder label 1 is to have an optical marking, a suitable marking element can be laminated onto a partial area of the transponder inlay 10. This can be, for example, a printed foil element, or also a foil element that can be inscribed by means of a laser or TTR. Alternative marking elements can be applied in the same way.

To protect the transponder label 1, in a further step a preferably transparent protective laminate can be applied to the transponder inlay 10 and, if appropriate, also to the marking element described above. Preferably, this is a transparent fabric film bonded to the transponder label 1 by means of adhesive.

In a further step S3, the remaining part of the antenna 11 which projects beyond the foam web is folded over around the foam web so that this remaining part of the antenna 11 comes to lie on a second side of the foam web, which can also be referred to as the bottom side, and a stripline antenna is thus formed. The folding of the transponder inlay 10 around the foam web or around a foam element 20 of the foam web is indicated in FIG. 3.

Subsequently, in a further step, an adhesive, preferably a pressure-sensitive adhesive, can be applied to the second side of the foam web with part of the antenna 11 and possibly also with part of the protective laminate. This application may be either over the entire surface, or the adhesive may be applied only in predefined areas of the second side. For example, the adhesive application can also be applied by a printing process. To protect such an adhesive 140, it can be covered with a liner in a further step after application. For this purpose, the liner may be provided as a film web, preferably wound on a roll. This liner is brought together with the second side of the foam web provided with adhesive. Adhesive application and liner application can also be carried out in a single common operation.

In a further step S4, electrical coupling of the sensor unit 30 to the chip 12 and/or the antenna 11 of the transponder inlay 10 is carried out. This can be implemented, for example, by means of electrically conductive tracks 31, which are formed as connecting lines between the transponder inlay 10 and the sensor unit 30. The application of conductive tracks 31 can be carried out in particular by means of imprinting a paste containing silver or copper. Alternatively, conductive tracks 31 can also be formed in a predetermined manner by means of etching. Furthermore, coupling the sensor unit 30 may also include forming the sensor unit 30 itself. For example, as illustrated in FIGS. 2 to 4, this is printed onto a foil substrate in the form of two spaced-apart zigzag-shaped conductive tracks 31 connected to the transponder inlay 10.

The steps described need not necessarily be carried out in the sequence indicated. It is also possible, for example, that the transponder inlay 10 is already provided with the antenna 11, the chip 12 and the coupled sensor unit 30, so that coupling of the sensor unit 30 has already taken place before the antenna 11 is folded around the foam element 20 or the foam sheet.

In a further step S5, the foam web with the transponder inlay 10 is cut through in a predetermined manner to form a single transponder label 1. In this process, the foam web can be punched so that by means of a punch which punches out individual transponder labels 1, the foam web and the liner are completely punched through and a single transponder label 1 is formed.

Alternatively, the punch can only penetrate through the foam web, leaving the liner undamaged. Thus, a continuous film web of the liner is obtained, on which the punched-out transponder label 1 is located. The unneeded part of the foam web can then be removed, which is called weeding.

By successively producing several such transponder labels 1, one thus obtains a foil web of the liner on which a plurality of transponder labels 1 are located in succession. In a further step, this film web with the transponder labels 1 can be rolled up and thus conveniently provided as roll material for further processing.

In summary, the present invention relates to a transponder label 1 for a metallic ground, which enables convenient and reliable detection and transmission of environmental parameters. The transponder label 1 is nevertheless relatively thin and also flexible. The invention further relates to a cost-effective roll-to-roll manufacturing process for such transponder labels 1.

REFERENCE SIGNS 1 electronic transponder label
10 transponder inlay
11 antenna of the transponder inlay
12 chip of the transponder inlay
13 active antenna section/transmitting surface of the antenna
14 passive antenna section/grounding surface of the antenna
20 spacer body/foam element
21 top side of the spacer body/foam element
22 bottom side of spacer body/foam element
30 sensor unit
31 conductive track
S(i) steps of a method for manufacturing a transponder label

The invention claimed is:

1. A transponder label (1) comprising:
a dielectric spacer body (20) having a first side (21) and a second side (22),
a transponder inlay (10) having a chip (12) and an antenna (11), the transponder inlay (10) being applied to the spacer body (20) such that a first part (13) of the antenna (11) is arranged on the first side (21) of the spacer body (20) and a second part (14) of the antenna (11) is arranged on the second side (22) of the spacer body (20), and a sensor unit (30) electrically coupled to the chip (12) of the transponder inlay (10) and configured to detect a measurement signal representative of a physical and/or chemical environmental parameter, wherein two electrically conductor tracks (31) spaced apart from one another form the sensor unit (30).

2. The transponder label (1) according to claim 1, comprising:

a flexible film substrate having a first side on which the transponder inlay (10), the spacer body (20) and the sensor unit (30) are arranged.

3. The transponder label (1) according to claim 2, comprising:

an adhesive layer disposed on a first side of the flexible film substrate.

4. The transponder label (1) according to claim 1, wherein the antenna (11) and/or the sensor unit (30) is formed by printing or etching or punching.

5. The transponder label (1) according to claim 1, comprising:

electrically conductive conductor tracks (31) that couple the sensor unit (30) to the chip (12) of the transponder inlay (10), wherein a respective conductor track (31) has one or more predetermined geometric structural changes.

6. The transponder label (1) according to claim 1, wherein at least one conductor track (31) comprises a plurality of conductive track sections having a respective longitudinal extension direction, wherein adjacent conductive track sections enclose a predetermined angle with respect to an orientation of their respective longitudinal extension direction relative to each other and form a zigzag-shaped conductor track (31).

7. The transponder label (1) according to claim 1, comprising:

a paper element or nonwoven element disposed on a conductor track (31) and having a predetermined absorbency.

8. The transponder label (1) according to claim 1, wherein the sensor unit (30) is configured to detect a measurement signal representative of a temperature, a pressure, a wetness, a humidity and/or a moisture.

9. The transponder label (1) according to claim 1, wherein the sensor unit (30) is configured to detect a measurement signal representative of a presence or an amount of a substance or a chemical.

10. The transponder label (1) according to claim 1, wherein the sensor unit (30) is configured to detect a measurement signal representative of a light intensity and/or an electrical quantity.

11. The transponder label (1) according to claim 1, wherein the sensor unit (30) is configured to detect a measurement signal representative of a fill level of a container.

12. The transponder label (1) according to claim 1, wherein the spacer body (20) is formed as a foam element.

13. The transponder label (1) according to claim 1, comprising:

a foil element covering at least a partial area of the transponder inlay (10).

14. A method of manufacturing a transponder label (1), comprising:

providing a dielectric spacer body (20) having a first side (21) and a second side (22), providing a transponder inlay (10) having a chip (12) and an antenna (11), providing a sensor unit (30) configured to detect a measurement signal representative of a physical and/or chemical environmental parameter, wherein two electrically conductor tracks (31) spaced apart from one another form the sensor unit (30), applying the transponder inlay (10) to the spacer body (20) so that a first part of the antenna (11) is arranged on the first side (21) of the spacer body (20), folding the transponder inlay (10) around the spacer body (20) so that a second part of the antenna (11) is located on the second side (22) of the spacer body (20), and electrically coupling the sensor unit (30) to the chip (12) of the transponder inlay (10), wherein providing and applying components for forming the transponder label (1) comprises printing or etching or punching the antenna (11), electrically conductor tracks (31) and/or the sensor unit (30), and wherein printing or etching or punching the sensor unit (30) comprises forming the sensor unit (30) in the form of two spaced apart electrically conductor tracks (31).

15. The method according to claim 14, comprising:

providing a flexible film substrate having a first side and a second side; and applying the transponder inlay (10), the spacer body (20), and the sensor unit (30) to the first side of the flexible film substrate.

16. The method of claim 15, comprising:

applying an adhesive to the first and/or the second side of the flexible film substrate.

17. The method of claim 14, comprising:

applying an adhesive to the first and/or second side (21, 22) of the spacer body (20).

* * * * *